Dec. 28, 1937.     O. P. HAEGELE     2,103,618
COUPLED WEIGHING
Filed July 26, 1935     2 Sheets-Sheet 1
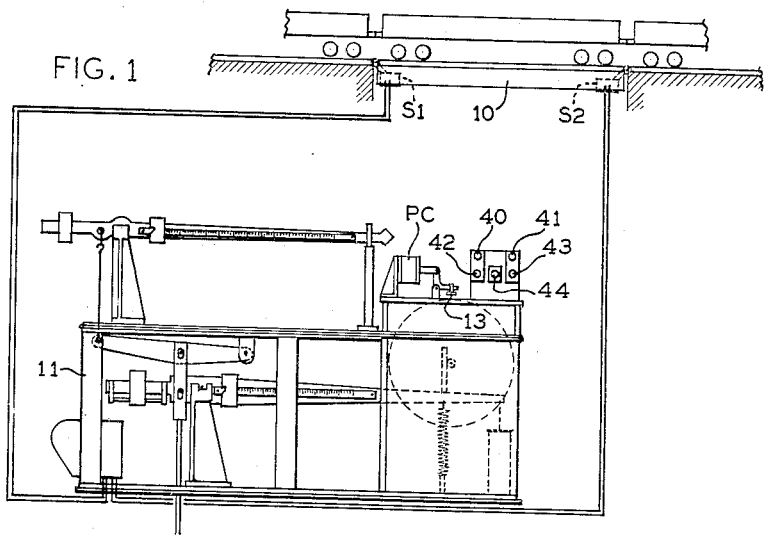
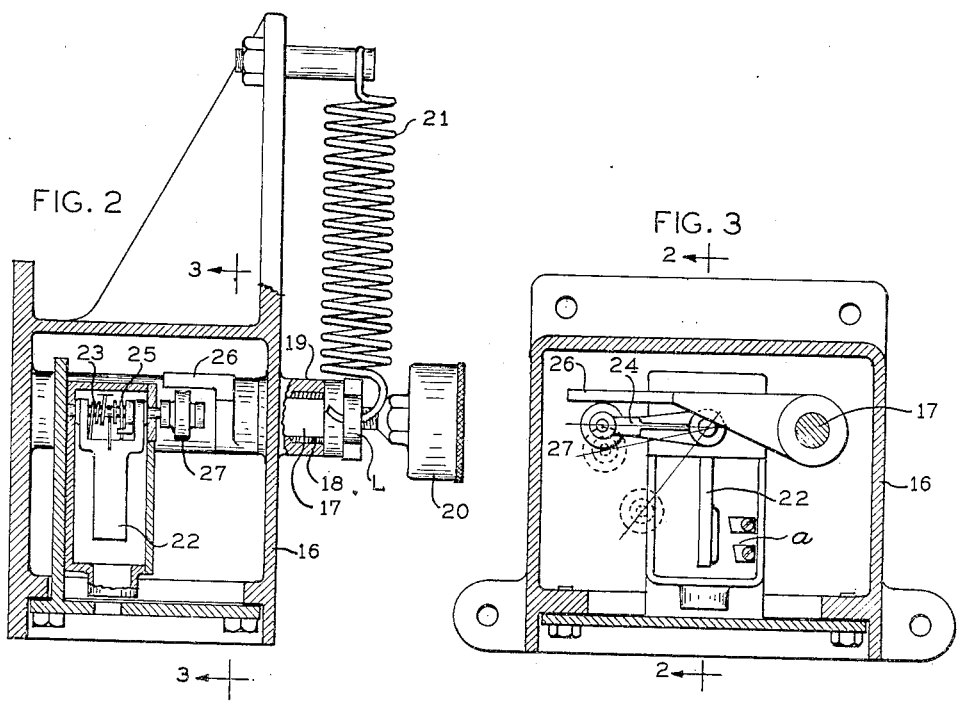
INVENTOR
OTTO P. HAEGELE.
BY Roland C. Rehm
ATTORNEY.

Dec. 28, 1937.  O. P. HAEGELE  2,103,618
COUPLED WEIGHING
Filed July 26, 1935   2 Sheets-Sheet 2
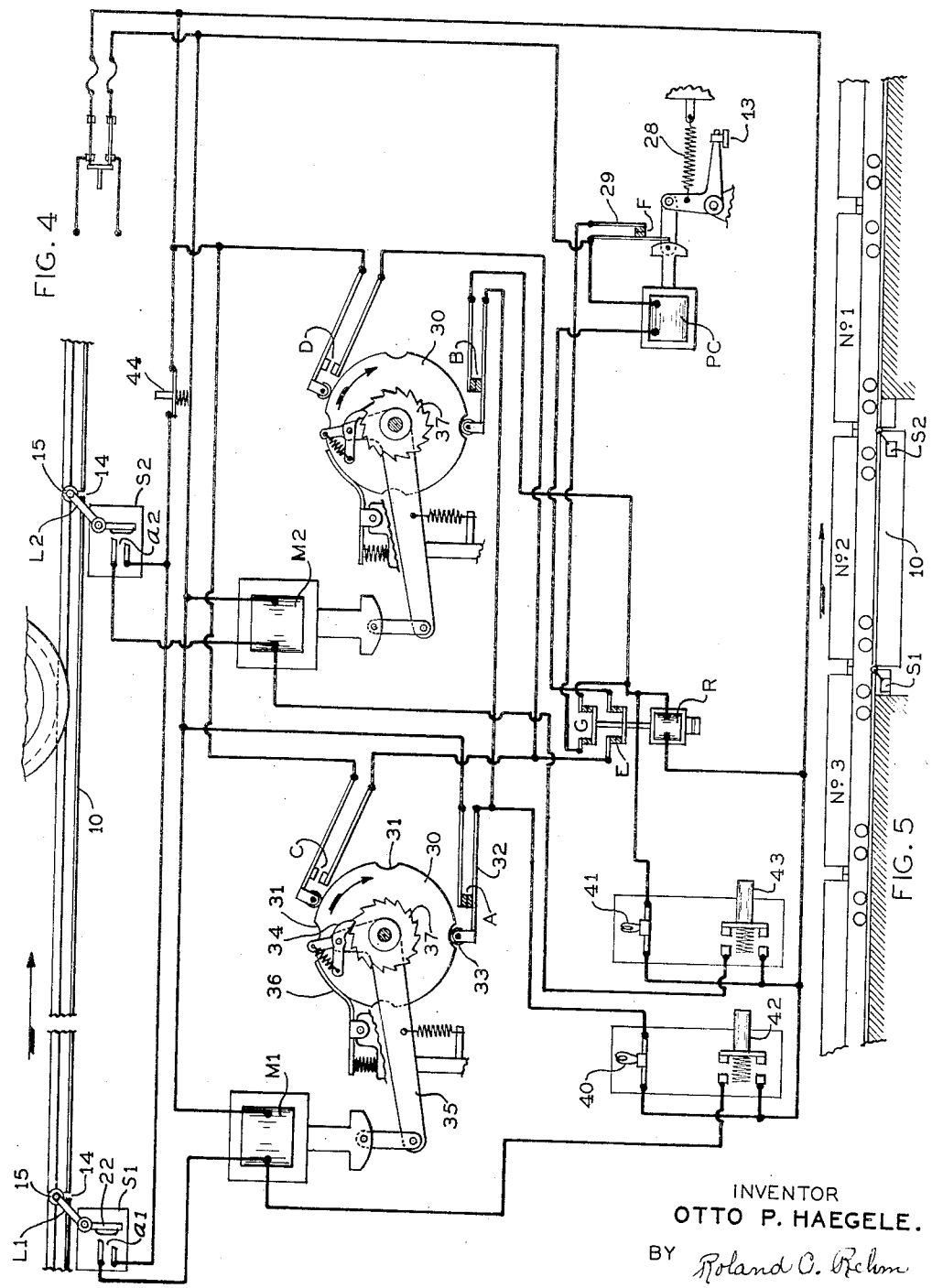
INVENTOR
OTTO P. HAEGELE.
BY Roland O. Rehm
ATTORNEY.

Patented Dec. 28, 1937

2,103,618

UNITED STATES PATENT OFFICE 2,103,618

COUPLED WEIGHING

Otto P. Haegele, Chicago, Ill., assignor to Streeter-Amet Company, Chicago, Ill., a corporation of Illinois Application July 26, 1935, Serial No. 33,306

8 Claims. (Cl. 265—5)

This invention relates to so-called motion weighing and, among other objects, aims to provide an improved and simplified apparatus for weighing a succession of cars or the like coupled in a train.

The nature of the invention may be readily understood by reference to one illustrative installation embodying the invention and shown in the accompanying drawings.

In said drawings:

Fig. 1 is a diagrammatic view of a track scale platform and associated weighing and recording apparatus;

Fig. 2 is a transverse sectional elevation of a car operated switch;

Fig. 3 is a sectional view thereof taken approximately on the plane 3—3 of Fig. 2;

Fig. 4 is a diagrammatic view of the control system for the recording apparatus; and Fig. 5 is a supplementary diagram illustrating the weighing of a train of coupled cars in motion across the scale platform.

The weighing of a succession of cars while coupled in a train presents a problem arising from variation not only in car lengths but in wheel bases, i. e., wheel or truck spacing. In the illustrative apparatus the operation of the recorder is controlled by wheel operated switches adjacent the ends of the scale platform. Associated with the switches is apparatus which counts the wheels entering and passing off the scale platform respectively and automatically operates the recorder when a single car is fully on the scale platform. Variation in lengths as aforesaid results in variation in the sequence of operation of the aforesaid switches as well as occasional simultaneous operation. The present apparatus is designed to function to actuate the recorder at the proper time regardless of the aforesaid sequence of operation or regardless of the direction of travel of the train of cars across the scale platform.

The scale or weighing platform 10 and the weighing apparatus 11 may be of any appropriate design. They are shown here only diagrammatically since their details form no part of the present invention. A typical apparatus for coupled weighing is shown in Wiley Patent No. 1,597,853 wherein the recorder is provided with mechanically actuated train of operating mechanism. Associated with the weighing apparatus is a recorder adapted to print the weight of the car on appropriate records such as a card or tape. The printing hammer 13 of the recorder is controlled by apparatus presently described. For weighing cars coupled in a train, the length of the scale platform should of course be appropriate to the average car length so that each car will momentarily be entirely and alone upon the scale platform.

The aforesaid car operated switches are in this instance located at the ends of the scale platform and arranged so as to be operated by the car wheels before they pass across the gap 14 between the live rail of the scale platform and the adjacent rail. As here shown, the switches are provided with wheel operated levers L1 and L2 carrying rollers 15 arranged at the gaps 14 respectively in position to be depressed by a wheel flange before it crosses the gap either in entering or leaving the scale platform. The switches S1 and S2 operated by the levers L1 and L2 may be of any appropriate design and preferably should embody a lost motion mechanism which will insure the closing of the switches regardless of the degree of motion of the levers L1 and L2, allowing the latter to be moved freely without the danger of damage to the switch mechanism itself. Switches of this type are generally characterized as limit switches and may be purchased on the open market. One such switch is illustrated in Figs. 2 and 3 and is enclosed in a tight housing 16 designed to prevent the entrance of moisture to the switch mechanism. Even the operating shaft 17 to which the levers L are pivoted, passes through a stuffing box 18. Supporting hubs 19 projecting from the housing wall provide adequate shaft bearings which are lubricated by grease cup 20. The outer end of the shaft carries the operating lever L which is restored to initial position after each operation by spring 21. On the interior of the housing is contact arm 22 adapted to close a circuit through a pair of contacts $a$ (being designated $a—1$ and $a—2$ in the respective switches in the diagram of Fig. 4). The contact arm is momentarily held out of engagement with contacts $a$ by a torsion spring 23 and is moved into engagement therewith upon a depression of the lever L. Coaxial with the contact arm is a rocking arm 24 connected therewith through a torsion spring 25. On the interior of the housing the operating shaft 17 carries an operating arm 26 which engages the roller 27 on rock arm 24 to operate the contact arm. As indicated in Fig. 3, the switch contacts $a$ are closed by only a very small angular movement of the operating shaft but the arrangement is such that the latter may have substantial additional movement without damage to the switch mechanism.

The recorder actuating mechanism in this instance comprises a solenoid PC which when operated energizes printing hammer operating spring 28 and when released allows the spring 28 to operate the printing hammer to effect a record as aforesaid. Associated with the recorder operating mechanism is a switch 29 having a pair of contacts carried on spring members so arranged that the switch is opened when printing coil PC is energized and closed when it is deenergized. As will presently appear, the opening of contacts F deenergizes solenoid PC allowing spring 28 to operate the printing hammer 13. The spring members of switch 29 are resiliently mounted to follow the solenoid core when the solenoid PC is energized for a distance sufficient adequately to tension spring 28. On slightly further movement of the core the outer spring member stops and contacts F thereupon separate to deenergize the solenoid. The entire operation is of course practically instantaneous.

The track switches control respectively solenoids M1 and M2 which respectively operate devices designed to inhibit operation of the recorder unless and until a car is entirely and alone upon the scale platform. In the present instance such devices comprise switch operating cams 30 carrying spaced notches 31 adapted to control the operation respectively of switches A and C and B and D. Each of such switches comprises a pair of contacts, one of which is mounted on a resilient arm 32 carrying a roller 33 designed when the latter enters a notch 31 in registry therewith, to close the switch contacts. When riding upon the outer or cylindrical periphery of the cams 30, the roller 33 opens the switch contacts. Cam 30 is periodically rotated in this instance by a rocking pawl 34 operated by rocking arm 35 connected to a solenoid M. A spring pressed friction drag 36 serves to prevent over-travel of cam 30 and in this instance limits its movements to one notch of the ratchet wheel 37 for each operation of the solenoid M, i. e., for each operation of the switch lever L. In the present instance the apparatus is designed for cars having two four-wheel trucks and the ratchet wheel 37 is provided with four teeth between each of the notches 31. Thus the cam is rotated through the angular distance between adjacent notches by four operations of track lever L,—that is, by the four wheels of a single car. It should be noted that the switches A and C in the one case and B and D in the other, are so arranged that their angular separation as regards their relation to the notches in the cams 30 is equivalent to the angular distance between adjacent ratchet teeth. Hence, in the positions illustrated in Fig. 4, the switch A will be opened and the switch C closed by the next single movement of the cam 30.

In Fig. 4 is illustrated diagrammatically one arrangement of controlling circuits for controlling the operation of the recorder and inhibiting its action unless and until a car is momentarily entirely and alone upon the scale platform. The various control devices have been illustrated in position just prior to the operation of the recorder,—that is, with a car entirely and alone upon the scale platform as shown for example in Fig. 5. If and when either of the levers L1 or L2 be depressed by the car about to leave the scale platform or by the car about to enter the scale platform, the recorder will be actuated to print a record. This arrangement allows a maximum of time for the scale to come to balance. As compared with mechanically actuated mechanisms such as shown for example in said Wiley patent, operation is instantaneous; the time lag incident to trains of mechanism is avoided. The disturbance to balancing by vibration set up by the operation of such trains of mechanism, is likewise eliminated.

The time allowed for balancing depends of course upon the rate of motion of the cars across the scale platform and may be made adequately long simply by adjusting the rate of travel of the train of cars. Whether the recorder is actuated by the car about to leave the scale platform or the car about to enter, depends upon the length of the car. If the car be a long car, it is likely that its front wheel will depress lever L2 before lever L1 is depressed by the following (#3) car (Fig. 5). On the other hand, if the car on the scale be a short car (like #3 car), it is quite likely that the recorder will be operated by the following car as it is about to enter the scale platform.

In the arrangement shown in Fig. 4, the controlling relay R is energized when both contacts A and B are closed (this condition is illustrated in the diagram). The recorder solenoid PC is operated when contacts C or D are closed. When solenoid PC is energized, it momentarily breaks contacts F (A or B then being open, since C or D will have closed), thus breaking the circuit through relay R and opening contacts E and G.

Contacts A and B are in and control portions of circuits which in series establish a circuit when both A and B are closed. Contacts C and D on the other hand control associated parallel circuits, the closing of either one of which operates the recorder.

In the present instance contacts G serve to maintain a circuit through relay R during such interval of time as may occur between the opening of contacts A or B and the closing of contacts C or D respectively.

The following is a brief explanation of the sequence of operations which take place in the normal use of the system:

1. For the purpose of describing the diagram of Fig. 4, let it be assumed that the recorder is actuated by the #2 car on the scale. This occurs when its front wheel depresses the exit track lever (being L2 in the present illustration). This energizes the exit coil M2, causing it to advance its cam 30 through the arc of one ratchet tooth, thereby opening switch B and closing switch D.

Since car #2 is entirely and alone upon the scale in the illustration assumed, a circuit is established through contacts D and contacts E of the relay R to energize printing coil PC, resulting in the opening of switch 29.

2. The opening of switch F opens the circuit through contacts G and relay R, thus deenergizing the latter and opening contacts E. Breaking the circuit through the latter contacts deenergizes printing coil PC and allows spring 28 to operate the recorder printing hammer.

3. Relay R, being a normally open relay, remains with contacts E and G open and cannot close again until it is energized by the closing of both contacts A and B. It is therefore necessary for the exit switch S2 to be actuated by the four wheels of a car in passing entirely off the scale before switch B will again be closed.

It should be noted that switch G maintains a circuit through relay R during the minute interval, if any, between the opening of contacts B and the closing of contacts D (or between the opening of A and closing of C). Relay R cannot therefore drop during any such interval.

Meanwhile, the next car (#3) follows car #2 onto the scale, depressing the entering switch lever L1 four times and advancing its cam 30 until switch A is again closed and C is open.

4. When both contacts A and B are closed, a circuit through relay coil R will be established, closing contact E and thus restoring the circuits to the condition illustrated in Fig. 4 in readiness to record a weight when either the entering or exit switch L is depressed.

5. If it be assumed that the recorder be operated by a car about to enter the scale, as in the case above mentioned where the car on the scale is a short car, the recorder printing coil is energized by the closing of contacts C. This energizes the printing solenoid PC through contacts E as aforesaid, and, upon the opening of contacts 29, results in the printing of a record. When the succeeding car #3 passes completely on the platform, following the making of a record, the entering track lever will have been depressed three additional times and the exit track lever will have been depressed four times by car #2 leaving the scale. The system will then be restored to the condition shown in Fig. 4.

The apparatus is advantageously provided with signal means in the form of lights 40 and 41 which serve to indicate the condition of the system and particularly to apprise the operator of any lack of coordination of the circuits such as might occur if an individual inadvertently depressed one of the track levers or where a car was partly entered upon the scale and then withdrawn. In the present instance signal light 40 is connected in series with contacts A and is lighted when the latter are closed. The lighting of this light indicates that conditions with respect to the entering track switch are in readiness for the recording of a weight. Light 41 which serves to indicate the normality of conditions with respect to the exit track switch is connected in series with both contacts A and B and therefore does not light unless both are closed. Thus when both lights are visible, the system is in readiness to record a weight.

If the lights are not visible when a car is completely and alone upon the scale, they indicate some irregularity in the system. This can be corrected by depressing the proper push button until the light shows or, as in the present instance, by pressing push buttons 42 or 43 which are connected in multiple with the respective track switches S1 and S2. Thus the pressing of the push buttons accomplishes the same thing as depressing a track lever. In the event the exit light 41 should not show when a car is completely and alone upon the scale, it is merely necessary to depress the push button 42 one or more times until the light 41 lights.

A normally closed push button switch 44 is advantageously inserted in the track switch circuit, to hold open the circuits through the track switches S1 and S2, to prevent the actuation of solenoids M1 and M2 and associated wheel counting mechanism, without deenergizing the system entirely. Such a switch is useful in testing the system and in resetting the wheel counting cams 30. Also actuation of the latter may be prevented by an engine or tender in passing over the scale. In such event the switch 44 may be released when the first car to be weighed is entirely on the scale platform.

It should be particularly noted that with the switch levers located at the gaps 14, the system will operate properly regardless of whether the travel of the train of cars be from right to left or from left to right. It is simply necessary that the track levers L1 and L2 be located so that they will be depressed by a car moving in either direction as the wheel is about to leave or about to enter the scale platform.

To simplify the description and claims, the expressions "car" or "cars" have been used in a generic sense as synonymous with vehicles.

Obviously the invention is not limited to the details of the illustrative embodiments herein shown and described, since these may be variously modified. Moreover, it is not indispensable that all features of the invention be used conjointly since various features may be used to advantage in different combinations and subcombinations.

Having described my invention, I claim:

1. Apparatus for weighing cars in a coupled train comprising in combination a scale including a scale platform, a recorder adapted to record the weight of a car on the platform, entrance and exit switches adapted to be actuated respectively a predetermined number of times by cars passing on and off the scale platform, counter mechanism for counting the number of actuations of said switches respectively, and recorder actuating mechanism controlled by said counter mechanism for operating said recorder when each of said switches have been actuated a predetermined number of times.

2. Apparatus for weighing cars in a coupled train comprising in combination a scale including a scale platform, a recorder adapted to record the weight of a car on the platform, entrance and exit switches adapted to be actuated respectively a predetermined number of times by cars passing on and off the scale platform, recorder actuating mechanism and series controlling circuits therefor, and mechanism operated by the actuations of said switches for establishing said circuits respectively upon a predetermined number of actuations of said switches respectively.

3. Apparatus for weighing cars in a coupled train comprising in combination a scale including a scale platform, a recorder adapted to record the weight of a car on the platform, entrance and exit switches adapted to be actuated respectively a predetermined number of times by cars passing on and off the scale platform, recorder actuating mechanism and series controlling circuits therefor, mechanism operated by the actuations of said switches for establishing said circuits respectively upon a predetermined number of actuations of said switches and parallel actuating circuits associated with said controlling circuits, said actuating circuits being adapted to be closed respectively by the next subsequent operation of a switch to effect the operation of said recorder.

4. Apparatus for weighing cars in a coupled train comprising in combination a scale including a scale platform, a recorder adapted to record the weight of a car on the platform, entrance and exit switches adapted to be actuated respectively a predetermined number of times by cars passing on and off the scale platform, recorder actuating mechanism and series controlling circuits therefor, mechanism operated by the actuations of said switches for establishing said circuits respectively upon a predetermined number of actuations of said switches and signal means for indicating the establishment of the respective series circuits.

5. Apparatus for weighing cars in a coupled train comprising in combination a scale including a scale platform, a recorder adapted to record the weight of a car on the platform, entrance and exit switches adapted to be actuated respectively a predetermined number of times by cars passing on and off the scale platform, recorder actuating mechanism and series controlling circuits therefor, mechanism operated by the actuations of said switches for establishing said circuits respectively upon a predetermined number of actuations of said switches, and circuit closers in parallel with said switches respectively adapted to be manually actuated to coordinate said switch actuated mechanism.

6. Apparatus for weighing cars in a coupled train comprising in combination a scale including a scale platform, a recorder adapted to record the weight of a car on the platform, entrance and exit switches adapted to be actuated respectively a predetermined number of times by cars passing on and off the scale platform, recorder actuating mechanism and series controlling circuits therefor, mechanism operated by the actuations of said switches for establishing said circuits respectively upon a predetermined number of actuations of said switches, circuit closers in parallel with said switches respectively adapted to be manually actuated to coordinate said switch actuated mechanism, and signal means for indicating said coordination.

7. Apparatus for weighing cars coupled in a train comprising in combination a scale including a scale platform of such length as to hold one car alone while coupled in a train, a recorder adapted to record the weight of a car on the platform, recorder actuating mechanism and controlling circuits therefor, a car operated switch adjacent the entrance end of said platform adapted to be actuated as a car comes on the platform and actuated a predetermined number of times prior to the operation of said recorder by the car in passing wholly upon the scale platform, and a device operated upon said predetermined number of actuations of said switch to establish one of said circuits for the subsequent actuation of said recorder to record the weight of the car.

8. Apparatus for weighing cars coupled in a train comprising in combination a scale including a scale platform of substantially car length to permit a car to be wholly and alone on the platform while coupled in a train, a recorder adapted to record the weight of a car on the platform, recorder actuating mechanism and controlling circuits therefor, an electric car operated switch adjacent the exit end of said platform adapted to be actuated a predetermined number of times by a preceding car passing entirely over said switch in leaving the scale platform, a switch circuit adapted to be closed upon each actuation of said switch, and a device operated by said switch circuit upon each actuation of said switch for establishing one of said controlling circuits upon the aforesaid predetermined number of switch actuations for operation of said recorder when the succeeding car is wholly and alone on said platform.

OTTO P. HAEGELE.